United States Patent [19]

Barone

[11] Patent Number: 5,388,939

[45] Date of Patent: * Feb. 14, 1995

[54] LADING SEPARATING AND BRACING MEANS

[76] Inventor: Joseph P. Barone, P.O. Box 1462, Blue Bell, Pa. 19422

[ * ] Notice: The portion of the term of this patent subsequent to May 24, 2011 has been disclaimed.

[21] Appl. No.: 218,129

[22] Filed: Mar. 24, 1994

Related U.S. Application Data

[63] Continuation-in-part of Ser. No. 96,711, Jul. 23, 1993, Pat. No. 5,314,276, which is a continuation of Ser. No. 610,810, Nov. 8, 1990, abandoned.

[51] Int. Cl.$^6$ .............................................. B60P 7/00
[52] U.S. Cl. .................................. 410/139; 220/552; 220/546; 410/141; 410/149
[58] Field of Search ................. 410/81, 121, 122, 127, 410/129, 130, 132, 137, 140, 141, 142, 143, 144, 145, 146, 147, 148, 151, 152, 153, 156; 220/529, 530, 531, 532, 533, 534, 535, 536, 537, 538, 539, 540, 541, 542, 543, 544, 545, 546, 547, 548, 549, 550, 551, 552, 553, 554

[56] References Cited

U.S. PATENT DOCUMENTS

| | | | |
|---|---|---|---|
| 2,077,649 | 4/1937 | Sweeley et al. | 410/156 X |
| 2,122,950 | 7/1938 | Reifer | 410/152 |
| 2,160,870 | 6/1939 | Jones | 410/137 |
| 2,214,042 | 10/1940 | Burdick | 220/553 |
| 2,467,681 | 4/1949 | McKinney | 410/152 |
| 2,468,101 | 4/1949 | Nampa | 410/150 |
| 2,543,175 | 2/1951 | Kilgore | 410/151 |
| 2,546,929 | 3/1951 | Nampa | 410/147 |
| 2,576,798 | 11/1951 | Mangels | 410/143 |
| 3,202,111 | 8/1965 | Chapman et al. | 410/147 |
| 3,352,595 | 11/1967 | Bezlaj | 410/139 |
| 3,367,287 | 2/1968 | Dunlop | 410/156 X |
| 3,490,388 | 1/1970 | Lundvall et al. | 410/139 |
| 3,554,136 | 1/1971 | Falk | 410/129 |
| 3,802,355 | 4/1974 | Hassellof | 410/132 |
| 4,074,634 | 2/1978 | Snow et al. | 410/152 |
| 4,236,854 | 12/1980 | Rogers | 410/129 |
| 4,699,270 | 10/1987 | Bohm | 220/532 |
| 4,737,056 | 4/1988 | Hunt | 410/151 |
| 4,743,151 | 5/1988 | Haberkorm | 410/121 |
| 4,772,165 | 9/1988 | Bartkus | 410/139 |
| 4,955,495 | 10/1990 | Ruebesam | 220/545 |
| 5,038,962 | 8/1991 | Ruebesam | 220/545 |
| 5,314,276 | 5/1994 | Barone | 410/139 |

Primary Examiner—David A. Bucci
Assistant Examiner—James Eller
Attorney, Agent, or Firm—John Lezdey

[57] ABSTRACT

The present invention provides a plurality of posts and tracks for placement within a freight carrying vehicle in different locations to accommodate the mounting of an unique support frame therein. The support frame in combination with the posts and tracks can be utilized horizontally or vertically to deck or brace articles of freight placed in the vehicle.

5 Claims, 6 Drawing Sheets

LADING SEPARATING AND BRACING MEANS

RELATED APPLICATIONS

This application is a continuation-in-part of application Ser. No. 08/096,711, filed Jul. 23, 1993, now U.S. Pat. No. 5,314,276, which is a continuation of application Ser. No. 07/619,810, filed Oct. 11, 1990, now abandoned.

FIELD OF THE INVENTION

This invention relates to new and useful improvements in freight loading and more particularly to parts and an arrangement of parts whereby standard hauling vehicles can be readily and economically equipped to provide for the supporting and bracing of freight of assorted shapes and sizes.

BACKGROUND OF THE INVENTION

The hauling of freight of assorted shapes, sizes and weights has established the need for a carrier to simply and conveniently equip the interior of a standard freight hauling vehicle with means to accommodate the freight, without substantially reducing the interior load capacity of the vehicle.

In the body of a typical railway car or truck, a horizontal bed or floor is provided for supporting articles to be transported. The articles are placed on this bed, and depending upon the size or weight of the articles, they may be stacked upon each other at two or more levels. In many instances, however, the stacking of the articles may be impractical due to the size, weight, configuration, or fragileness thereof in which case, substantial amounts of space within the interior of the body may be unusable. As an example, when the articles are of a somewhat fragile character, damage to the articles can occur if stacked upon one another. The problem being that the weight of the upper articles could cause damage to the lower articles. In those instances, it is often necessary either to avoid stacking in tiers or to minimize the amount of stacking. The end result in most cases is a loss of usable cubic footage.

Moreover, some articles are difficult to load due to the different shapes thereof, which creates various problems. For example, even if freight articles at a lower level will not be damaged from weight when other articles are stacked thereon, the stacking operation itself may be quite irregular and inefficient due to the different shapes of the articles at the lower level. This incompatibility can cause the freight at the upper level to move, shift sideways, or fall and become lodged in between the freight at the lower level which hinders the unloading operation and may damage the freight itself.

Attempts have been made to alleviate some of these problems by incorporating intermediate decks in vehicles. In such vehicles, stacking problems can be eliminated since the deck will support the weight of the upper articles. However, vehicles with permanent decks have several negative aspects to be considered. First their adjustability is limited in many cases to one fixed height. Second, they are unable to divide in half and form two separate decks when the size and shape of certain articles deem it necessary. Third permanently installed decks weigh approximately 3000 lbs. in a large trailer. Consequently when the decks are not needed, the additional unwanted weight can have a dramatic effect on shipping costs. Finally, the use of other collapsible or removable intermediate decks has not met with much success due to functional limitations and inefficiencies in design that render the decks impractical for use in general freight operations.

In order to avoid the aforementioned problems, it is therefore desirable to provide a decking means that can utilize the unused space in vehicles which results from the shipping of fragile or odd sized freight. It is also desirable to provide a decking means that can be used alternatively as a bracing means to prevent damage caused by the forward, backward and sideway movement of freight. It is further desirable that such decking and bracing means be capable of installation by a single person and be readily assembled or disassembled as the size and shape of the freight changes from one shipment to another. It is also desirable to provide an alternative decking and bracing means that can function without sidewall mounted tracks so as to be useful in load carrying bodies with sidewalls not capable of supporting heavy weight.

U.S. Pat. Nos. 2,468,101 and 2,467,681 disclose the use of sidewall mounted tracks and cross bars for forming a means to support or brace freight within a vehicle. However, the arrangements formed with the sidewall tracks and cross bars are not sufficiently versatile to accommodate certain types of freight without wasting space.

U.S. Pat. No. 2,160,870 discloses a partitioning means which extends completely across the vehicle forming a bulkhead. The partitioning means is not used as a load bearing member.

It is therefore a general object of this invention to provide a vertically adjustable decking and bracing means for freight carrying vehicles which will provide maximum efficiency in the loading thereof.

It is a more specific object of this invention to provide an alternative decking and bracing means for freight carrying bodies in which the alternative means is non-dependent on sidewall mounted tracks.

It is still a further object of this invention to provide lading separating and bracing means for a freight carrying body in which one or more of these means can be easily disassembled and stored therein or elsewhere when not in use.

It is yet another object of this invention to provide in a freight carrying body a freight supporting means including intermediate decks that can be adjusted vertically to meet the various vertical dimensions of the freight beneath it.

SUMMARY OF THE INVENTION

The present invention provides a unitary support frame for decking or bracing articles of freight in a load carrying body of a truck, trailer or railway car. The body has at least three pairs of spaced vertical support members mounted within and held in place by attachment means. A first and a second pair of the vertical members are respectively positioned adjacent to the left and right sidewalls of the body. A third pair of the vertical members is positioned along the center of the body between the first and second pairs. When the frame is used for decking purposes, it is placed in a horizontal orientation. One end of the frame is then secured to either pair of spaced vertical members mounted adjacent to the sidewalls, and the opposite end of the frame is secured to the pair of spaced vertical members positioned along the center of the body. By this arrangement, a decking means is provided to support articles of freight thereupon. Alternatively, the frame can be used in a first vertical orientation as a bracing means to retain articles of freight against the sidewalls of the body. This occurs when the frame is positioned vertically between and secured to the pair of spaced vertical members along the center of the body. The frame can also be used to retain articles of freight against the front wall of the body. This is done by placing the frame in a second vertical orientation and having one end of the frame secured to a vertical member mounted adjacent a sidewall and having the opposite end of the frame secured to an aligned vertical member mounted along the center of the body.

These and other objects of this invention will appear hereinafter and for purposes of illustration, but not of limitation, and specific embodiments of the invention are shown in the accompanying drawings.

DESCRIPTION OF THE PREFERRED EMBODIMENTS OF THE INVENTION

Although specific terms are used in the following description for the sake of clarity, these terms are intended to refer only to the particular structure of the invention selected for illustration in the drawings, and are not intended to define or limit the scope of the invention.

Figure 1:
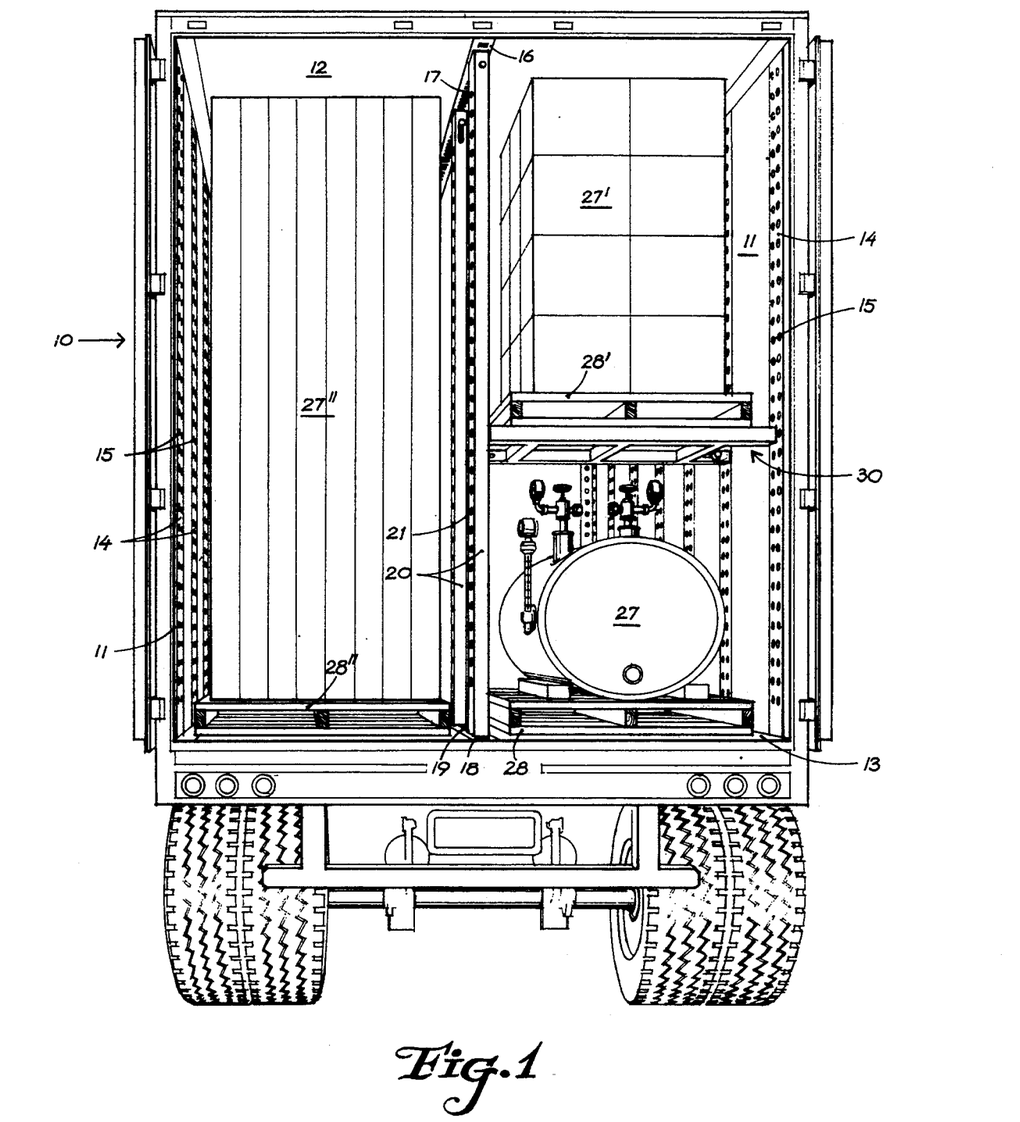
FIG. 1 is a perspective view of the interior of a freight carrying vehicle with a unitary support frame in a partial decking arrangement in which the vertical support members are posts and sidewall mounted tracks.

Referring now to FIG. 1 of the drawings, there is shown a body 10 of a freight carrying vehicle having left and right opposing vertical sidewalls 11 and a ceiling 12 parallel to a freight supporting floor 13. Mounted within the body 10 is the freight supporting and bracing apparatus of the invention in an arrangement that includes vertical tracks 14 fixed on each sidewall 11 to provide vertical support members. Each vertical track 14 is provided with a plurality of spaced apertures 15 along its length. Equidistant from each sidewall 11, a track 16 with spaced apertures 7 along its longitudinal axis is mounted on the ceiling 12 and oppositely aligned with another track 18 with spaced apertures 19 which is mounted on the floor 13. Along the center of the body 10 is a pair of spaced posts 20 vertically mounted and secured to tracks 16 and 18 by locking pins. (not shown). The locking pins, which are on opposite-ends of the posts 20, are engaged with apertures 17, 19 in the tracks 16, 18. Each post 20 has, a series of spaced apertures 21 along its longitudinal axis aligned with apertures 15 in a track 14 on the right sidewall 11. Located on the right side of body 10 is a support frame 30 which is horizontally mounted to posts 20 and tracks 14 by means of connecting pins (not shown) on opposite ends of the frame 30 which engage with apertures 21 and 15 to thereby form two compartments.

A tank 27 is mounted on a pallet 28 in the bottom compartment and cartons 27' are mounted on a pallet 28' in the upper compartment. On the left side of the body 10 a third compartment contains a pallet 27" with a large wooden crate 27" mounted thereon. Thereby, the body .10 is capable of accommodating different types and sizes of freight without wasting interior space.

Figure 2:
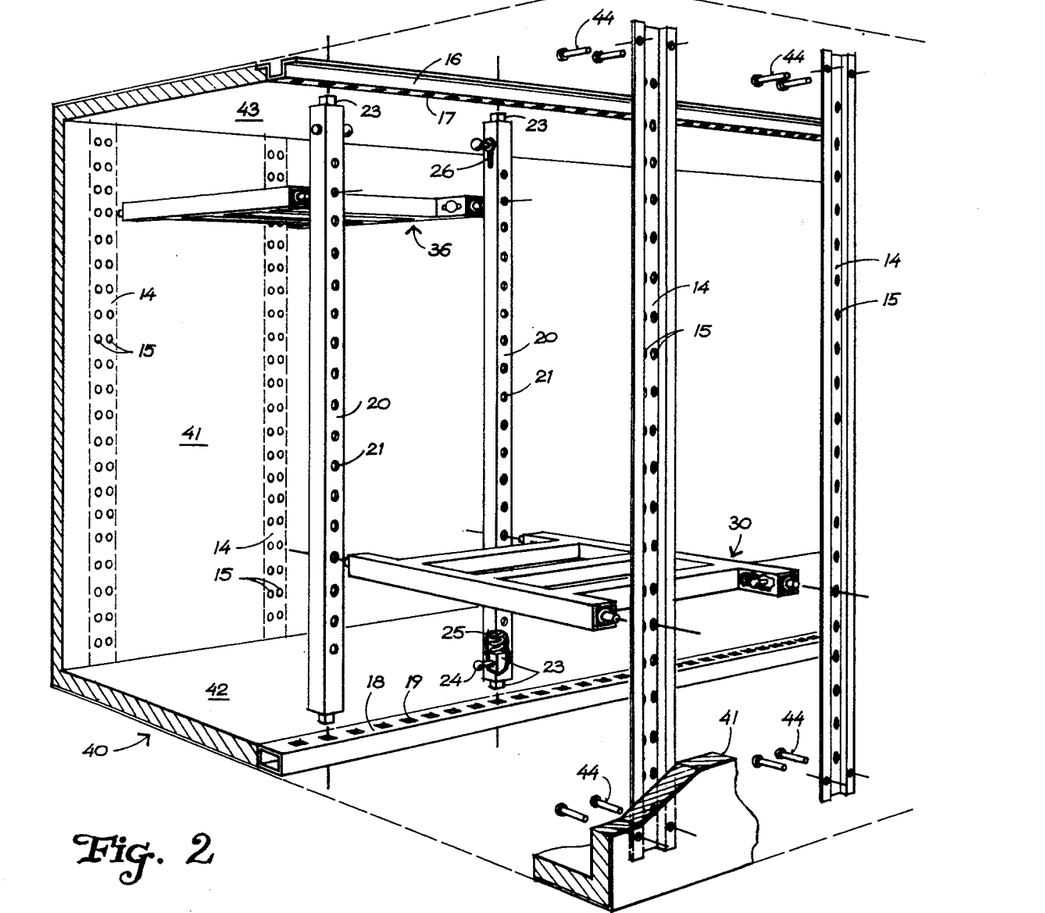
FIG. 2 is a perspective view of a freight carrying body with portions broken away, and a partially exploded view of a decking means that can be used within the body.
Figure 3:
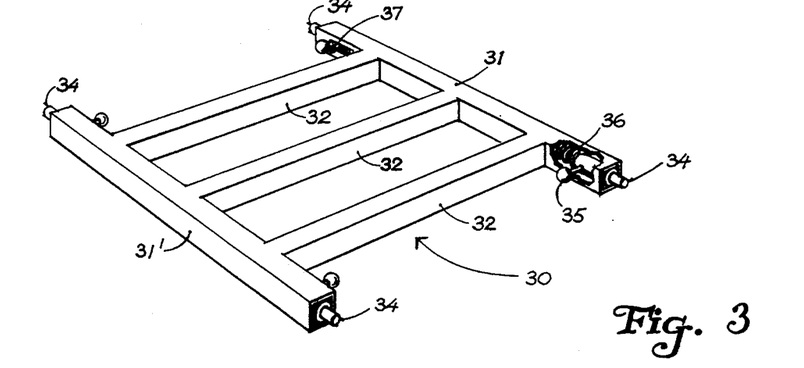
FIG. 3 is a perspective view of a unitary support frame.

In order to appreciate the simplicity of the invention and fully understand how it operates, FIG. 2 illustrates in detail a twin decking arrangement for use in a freight carrying body 40. The body 40 has opposing vertical sidewalls 41, a floor 42 disposed in a horizontal plane and a ceiling 43 parallel to the floor 42. As shown, opposing vertical tracks 14 that mount to sidewalls 41, and posts 20 engageable with tracks 16, 18 that mount to the ceiling 43 and floor 42, provide vertical support members for unitary support frames 30. The combination of these parts forms a vertically adjustable decking means that extends from one sidewall 11 to the other. The central supports for the decking means are posts 20, each of which has a hollow portion on each end wherein a locking pin 23 is mounted and projects outwardly therefrom. At least one locking pin 23 on each post is manually retractable by means of a lever 24 and extendable from its retracted position by means of a spring 25. The lever 24 is connected to the pin 23 and is movable within a slot 26 in the post 20. The pin 23 can be locked in a conventional manner when retracted or extended. Collectively, the pin 23, lever 24, and spring 25 comprise a locking means in which the pin 23 is engageable with apertures 17, 19 in tracks 16, 18 mounted on the ceiling 43 and floor 42 of the body 40. Together, the locking means on the posts 20 and the tracks 16, 18 on the ceiling 43 and floor 42 provide an attachment means for mounting posts 20 vertically to the body 40. The posts 20 are also provided with a series of spaced apertures 21 along their longitudinal axes. Apertures 21 can be on one or more sides of the posts 20. As shown, the posts 20 are positioned so that their apertures 21 are in alignment with the apertures 15 in the opposing vertical tracks 14. The vertical tracks 14 can be integral with each sidewall 41 as shown on the left side of the body 40, or alternatively, mounted adjacent each sidewall 41 and secured thereto with suitable attachment means such as bolts 44 or other fasteners which pass through conventional apertures (not shown) on each sidewall 41 of the body 40. Each vertical track 14 has a plurality of spaced apertures 15 along the longitudinal length thereof oppositely aligned with apertures 15 in an opposing vertical track 14. Horizontally positioned between the tracks 14 and posts 20 are unitary support frames 30, one of which is detailed in FIG. 3. Each of the frames 30 comprises a pair of substantially parallel spaced elongated members 31, 31' and a plurality of spaced support arms 32 extending between and connected to the elongated members 31, 31'. Similar to the posts 20, each support frame 30 is also provided with retractable pins 34, each mounted within a hollow portion on each end of the elongated members 31, 31' and projecting outwardly therefrom. Each of these pins 34 is retained in its position shown in FIG. 3 by the bias of a spring 36 and is manually retractable by means of a lever 35. The lever 35 is connected to pin 34 and is movable within an L-slot 37 in its respective elongated member 31 or 31'. The pin 34 can be locked in a conventional manner when retracted or extended. Collectively, the pin 34, lever 35 and spring 36 form a connecting means. The connecting means at each end of the support frames 30 allows the support frame pins 34 to extend and be connected by way of apertures 21, 15 to their respective posts 20 and tracks 14 in order to mount the support frames 30 horizontally thereto. Advantageously, the connecting means are also adapted to secure the support frames 30 vertically to posts 20, or posts 20 and tracks 14 to provide a bracing means. The pins 34 will engage with the apertures 21 and 15 whether the frame 30 is positioned horizontally or vertically. Examples of the support frames 30 being used in vertical orientations are shown in FIGS. 5,7,12 and 13.

Figure 4:
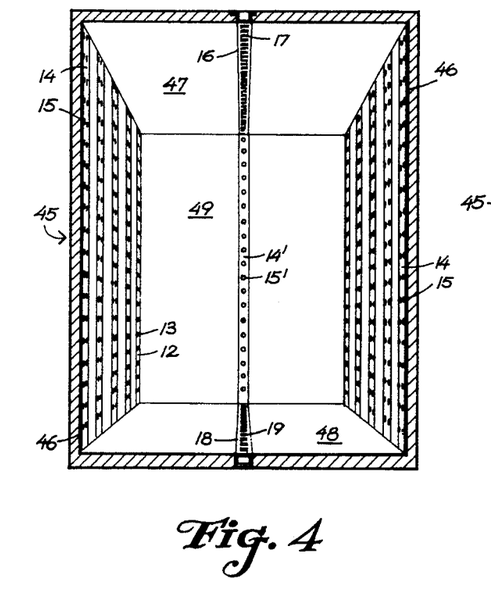
FIG. 4 is a perspective view of the interior of a load carrying body having vertical tracks on the sidewalls to provide vertical support members, and tracks along the ceiling and floor surfaces to provide attachment means for posts.

Now that a general idea has been presented concerning the parts of the invention and how they relate to each other, it is important to see specifically how they are arranged to provide their various functions. FIG. 4 shows a freight carrying body 45 having opposing vertical tracks 14 with aligned apertures 15. The tracks 14 are fixed to sidewalls 46 to provide vertical support members. Tracks 16 and 18, which are respectively mounted on the ceiling 47 and floor 48, are equidistant from each sidewall 46 so that apertures 17 are aligned with apertures 19. An optional track 14' with apertures 15' is mounted adjacent to a front wall 49. The aforementioned arrangement of tracks in the body 45 is the basis for the attachment of the posts 20 and frames 30.

Figure 5:
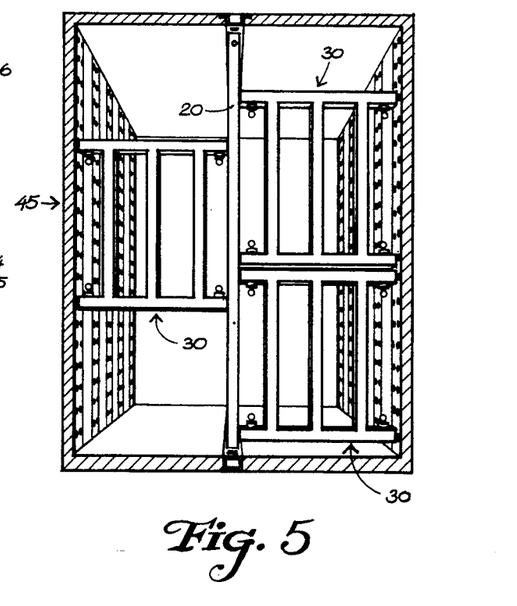
FIG. 5 is a perspective view of the interior of a load carrying body having sidewall tracks, a centrally mounted post and three vertically oriented support frames which form a bracing means.

As illustrated in FIG. 5, a bracing means is mounted within the freight carrying body 45 of FIG. 4. The bracing means includes one centrally mounted post 20 and three vertically oriented support frames 30. Each support frame 30 is supported on one end by a sidewall track 14 and on the opposite end by the centrally mounted post 20.

Figure 6:
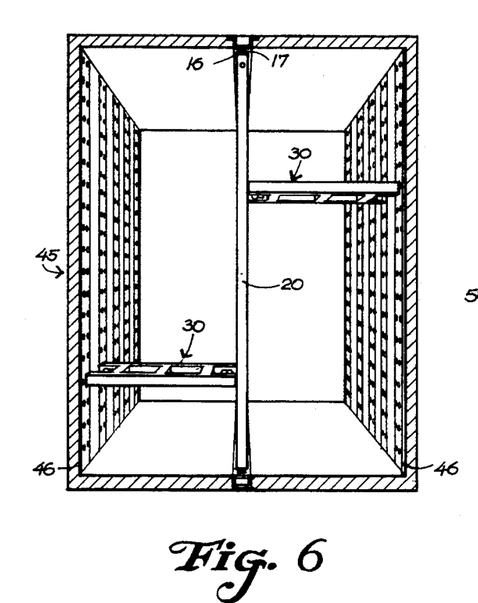
FIG. 6 is a perspective view of the interior of a load carrying body having sidewall tracks, centrally mounted posts and two horizontally oriented support frames which form a decking means.

As shown in FIG. 6, a decking means can also be mounted within the freight carrying body 45 of FIG. 4. The decking means includes a pair of horizontally oriented support frames 30. Each frame is secured at one end to a centrally mounted pair of spaced posts 20 (only one of which is shown) and each frame 30 is secured at its opposite end to a pair of vertical tracks 14.

Figure 7:
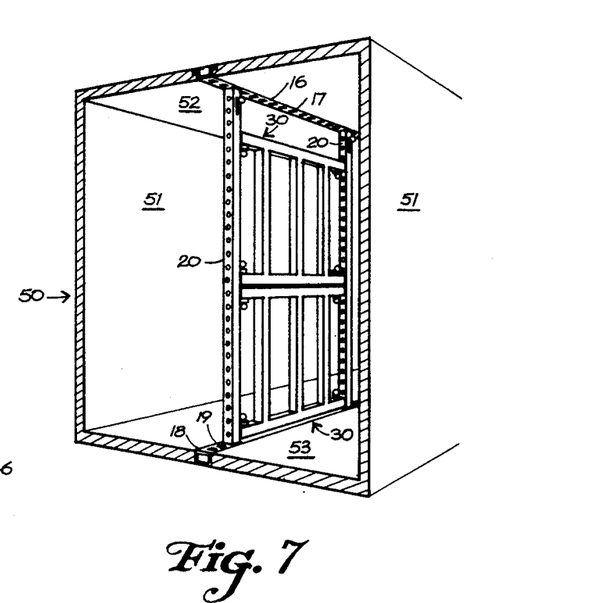
FIG. 7 is a perspective view of the interior of a load carrying body having a bracing means arranged longitudinally along the center.

In FIG. 7, a freight carrying body 50 is equipped along the center with a pair of longitudinally spaced vertical posts 20. The posts 20 are mounted to track 16 on ceiling 52 and track 18 on floor 53 to support a pair of vertically oriented support frames 30 positioned therebetween. This arrangement separates the body 50 into two compartments and provides a bracing means to retain articles of freight against sidewalls 51 of the body 50.

Figure 8:
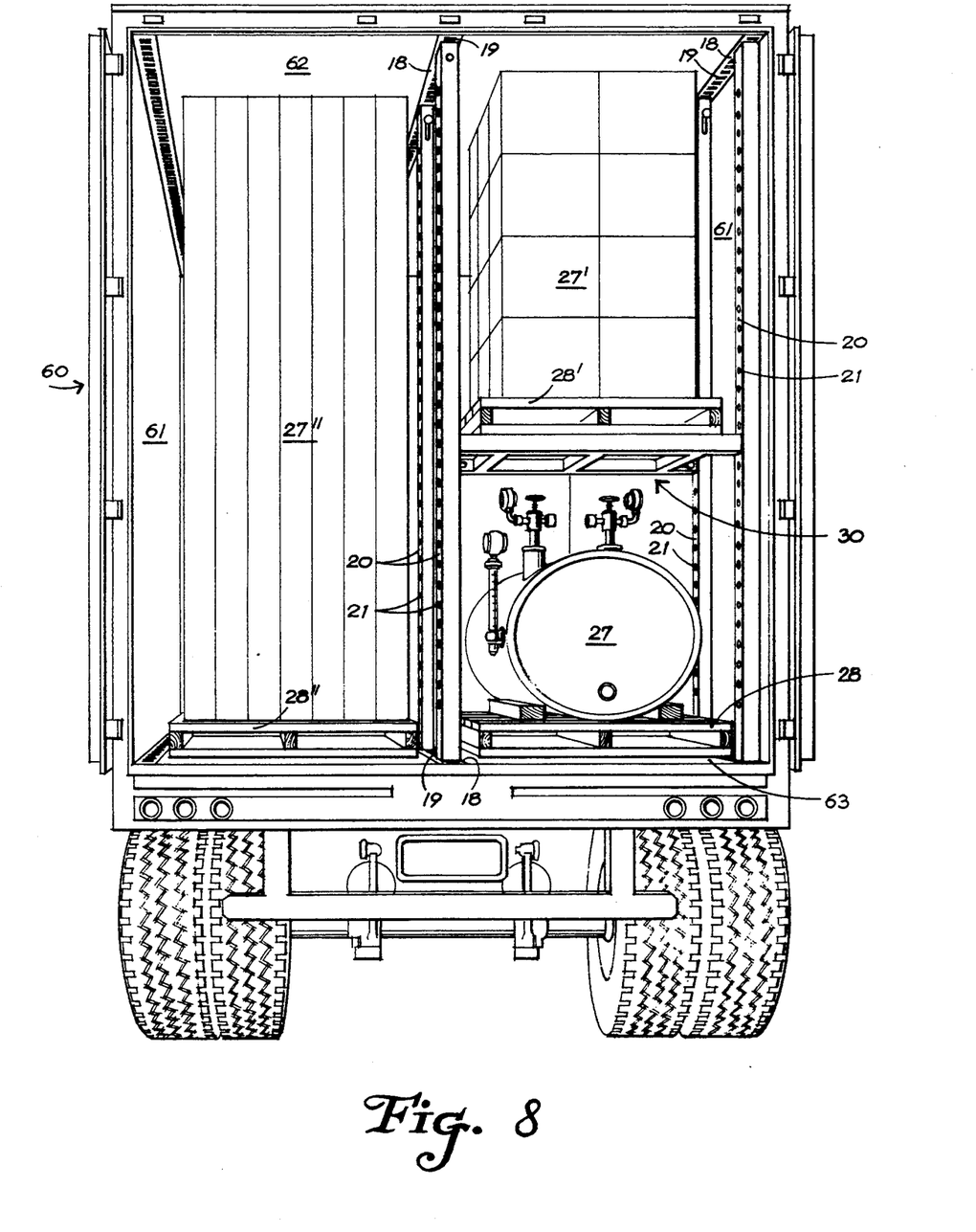
FIG. 8 is a perspective view of the interior of a freight carrying vehicle with a unitary support frame in a partial decking arrangement in which the vertical support members are posts.

At this point in the general description of the invention alternative means for decking and bracing freight shall henceforth be described. The first example is FIG. 8, which illustrates a partial decking arrangement in a body 60 of a freight carrying vehicle in which posts 20 are used in place of sidewall mounted tracks 14 to provide vertical support members. The body 60 has left and right opposing vertical sidewalls 61, and a ceiling 62 parallel to a freight supporting floor 63. Installed within the body 60 is the freight supporting and bracing apparatus of the invention which includes tracks 16 mounted on the ceiling 62 adjacent to each sidewall 61 and along the center of the body 60. Tracks 18 mounted on the floor 63 are positioned under the ceiling tracks 16 and aligned therewith to thereby provide an attachment means for mounting a pair of spaced vertical posts 20 adjacent to the right sidewall 61 and a pair of spaced vertical posts 20 along the center of the body 60. The posts 20 are secured to their respective tracks 16, 18 by locking pins (not shown) on their opposite ends which are engaged with apertures 17, 19 in the tracks 16, 18. The vertically mounted posts 20 are also provided with a series of spaced apertures 21 along their longitudinal axes. As shown, each pair of posts 20 is positioned so that apertures 21 in one pair of posts 20 are aligned with apertures 21 in the other pair of posts 20. With this positioning of posts 20 it is then possible to mount the support frame 30 horizontally thereto in order to provide a decking means. The support frame 30 is secured to the posts 20 by retractable connecting pins (not shown) on each end of the frame 30 which engage with apertures 21 in the posts 20. Under such an arrangement, a large box of freight 27" can be placed on a pallet 28" and loaded in the compartment on the left side of the body 60. Another article of freight 27 can be placed on a pallet 28 and loaded in the lower compartment on the right side of the body 60 while a third shipment of freight 27' can be placed on a pallet 28' and loaded in the compartment above freight 27. Thereby, the frame 30 with freight 27 thereupon can be supported without sidewall mounted tracks, and all of the cubic space at the rear of body 60 can be utilized.

Figure 9:
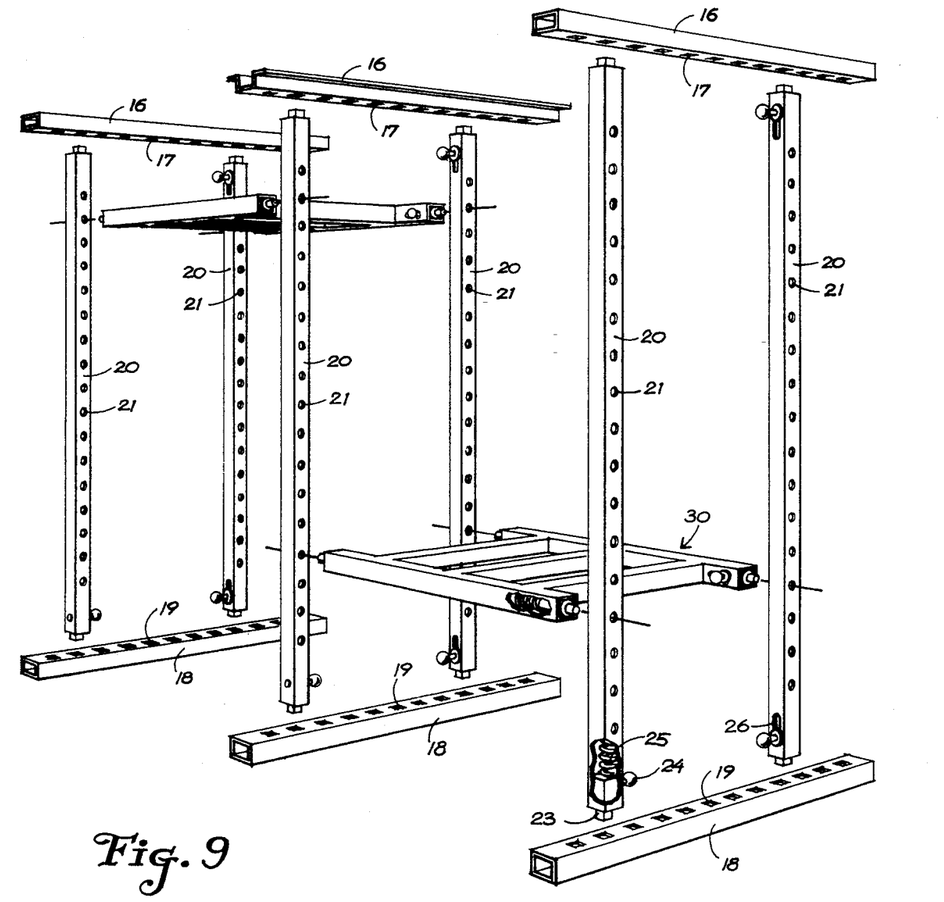
FIG. 9 is a partially exploded perspective view of an alternative decking means which can be used in the body of a freight carrying vehicle.

A broader illustration of the alternative means can be seen in FIG. 9, which illustrates in detail a decking means somewhat similar to the one shown in FIG. 2. This type of decking means is ideal for load carrying bodies adapted for refrigeration and bodies constructed of fiberglass reinforced polyester material because these bodies generally have sidewalls that are not recommended for supporting heavy loads and would require independent support means to do so. This arrangement can also be installed into fleets of existing trailers, containers, and railway cars without reconstructing the sidewalls. The difference between this arrangement and the arrangement of FIG. 2 is that the vertical tracks 14 of FIG. 2 are replaced with posts 20 that engage tracks 16, 18, which mount to the ceiling and floor surfaces of a freight carrying body.

Figure 10:
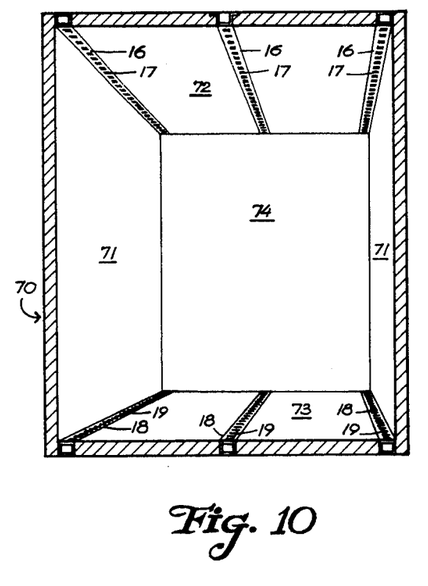
FIG. 10 is a perspective view of the interior of a freight carrying body having tracks on the ceiling and floor to provide attachment means for mounting vertical support members such as posts.
Figure 11:
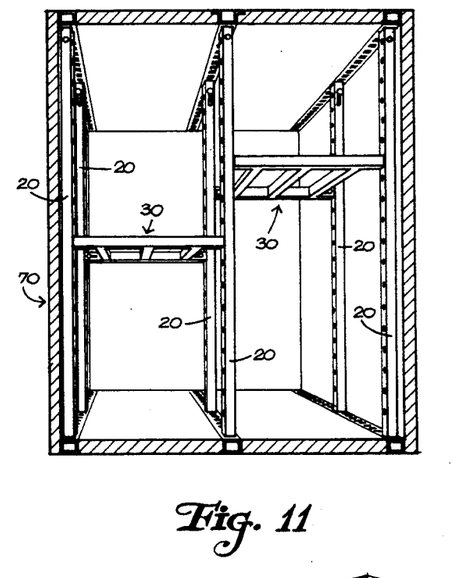
FIG. 11 is a perspective view of the interior of a freight carrying body with the alternative decking means of FIG. 9 installed therein.

FIGS. 10 and 11 further illustrate how the decking means shown in FIG. 9 can be placed in a freight carrying body 70 without using sidewalls 71 for supports. Tracks 16 and 18 are respectively mounted to ceiling 72 and floor 73 and extend longitudinally to a front wall 74 so that the decking unit of FIG. 11 can be longitudinally adjusted as desired.

Figures 12, 13:
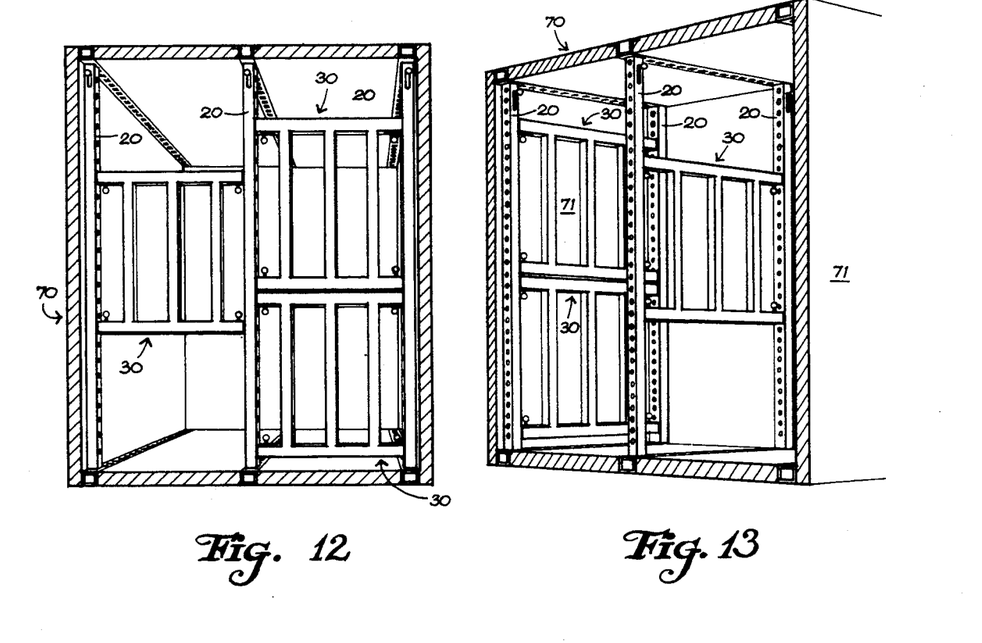
FIG. 12 is a perspective view of the interior of a freight carrying body with an alternative bracing means in which frames are supported by posts engaged with tracks on the ceiling and floor.
FIG. 13 is a perspective view of the interior of a freight carrying body with a bracing means arranged longitudinally along the center and additional means being stored against a sidewall.

Accordingly, the alternative decking means can also be rearranged to provide a bracing means. FIG. 12 illustrates how the freight carrying body 70 of FIG. 10 can be provided with bracing apparatus which includes three vertically mounted posts 20 and three vertically oriented support frames 30. The frames 30 are secured to the posts 20 to retain articles of freight against the front wall 74 of the body 70. The advantage of this arrangement as compared to the one of FIG. 5 is that the bracing unit of FIG. 12 can be longitudinally adjusted in small increments throughout the entire length of the body 70.

In the last illustration, FIG. 13 shows how posts 20 and frames 30 can be stored along the sidewall 71 of the body 70 of FIG. 10. Also, the frame 30 can be used to retain articles of freight against the sidewalls 71 when vertically positioned between a pair of centrally mounted posts 20.

Thus, the devices of the present invention can be used to effectively and efficiently provide decking, bracing and separating means for freight vehicles such as trucks, vans, railroad cars and the like.

Posts 20, tracks 14, 16 and 18 and support frames 30 can be made of any sturdy metal such as aluminum or steel. The size and strength of each part depends upon the load of the freight being carried by the vehicle.

I claim:

1. In a freight carrying body having a floor disposed in a horizontal plane, left and right opposing vertical sidewalls, a front wall, a ceiling parallel to the floor, at least three pairs of spaced vertical support members, each one of said pairs being spaced apart from one another and extending substantially between the ceiling and the floor, said vertical support members having attachment means engaged with means on said body mounting said vertical support members thereto, a first and a second pair of said vertical members respectively mounted adjacent to the left and right sidewalls with each pair opposing the other, each vertical member in said first and second pairs having a plurality of spaced apertures along the longitudinal length thereof, said apertures in said vertical members of said first pair being aligned with said apertures in said vertical members of said second pair, a third pair of said vertical members mounted at equal distance from each sidewall between said first and second pairs, each vertical member in said third pair having a plurality of spaced apertures along the longitudinal length thereof oppositely aligned with apertures in vertical members of said first and second pairs;

the improvement comprising a unitary support frame having a pair of substantially parallel spaced elongated members, spaced support arms extending between said elongated members and being fixedly connected thereto, a detachable connecting means mounted on each end of the elongated members to secure each end thereof to one of said vertical support members, said unitary support frame in a horizontal orientation having said connecting means on one end of said frame engaged with selected apertures in one of said pairs of vertical members that are adjacent to the sidewalls and having said connecting means on the opposite end of said frame engaged with aligned apertures in said third pair of vertical members to provide an upper decking means to support articles of freight thereupon, or alternatively, said support frame is used in a first vertical orientation as a bracing means to retain articles of freight against the sidewalls of said body when positioned between said third pair of spaced vertical members and having said connecting means on one end of said frame engaged with selected apertures in one of said vertical members of said third pair and having said connecting means on the opposite end of said frame engaged with aligned apertures in the other one of said vertical members of said third pair, said support frame being used in a second vertical orientation to retain articles of freight against the front wall of said body by having the connecting means on one end of said frame engaged with selected apertures in a selected vertical member adjacent to one of the sidewalls and having the connecting means on the opposite end of said frame engaged with aligned apertures in one of said vertical members of said third pair.

2. Apparatus for supporting and bracing freight in a load carrying body, said body having a floor disposed in a horizontal plane, left and right opposing vertical sidewalls, a front wall, and a ceiling parallel to the floor, said apparatus comprising: at least three pairs of spaced vertical support members, each one of said pairs being spaced apart from one another and extending substantially between the ceiling and the floor, a first and a second pair of said vertical members respectively positioned adjacent to the left and right sidewalls with each pair opposing the other, each vertical member in said first and second pairs having a plurality of spaced apertures along the longitudinal length thereof, said apertures in said vertical members of said first pair being aligned with said apertures in said vertical members of said second pair, a third pair of said vertical members positioned at equal distance from each sidewall between said first and second pairs, each vertical member in said third pair having a plurality of spaced apertures along the longitudinal length thereof oppositely aligned with apertures in vertical members of said first and second pairs;

attachment means mounting said vertical support members to said body;

a unitary support frame comprising a pair of substantially parallel spaced elongated members, spaced support arms extending between said elongated members and being fixedly connected thereto, a detachable connecting means mounted on each end of the elongated members to secure each end thereof to one of said vertical support members, said unitary support frame in a horizontal orientation having said connecting means on one end of said frame engaged with selected apertures in one of said pairs of vertical members that are adjacent to the sidewalls and having said connecting means on the opposite end of said frame engaged with aligned apertures in said third pair of vertical members to provide an upper decking means to support articles of freight thereupon, or alternatively, said support frame is used in a first vertical orientation as a bracing means to retain articles of freight against the sidewalls of said body when positioned between said third pair of spaced vertical members and having said connecting means on one end of said frame engaged with selected apertures in one of said vertical members of said third pair and having said connecting means on the opposite end of said frame engaged with aligned apertures in the other one of said vertical members of said third pair, said support frame being used in a second vertical orientation to retain articles of freight against the front wall of said body by having the connecting means on one end of said frame engaged with selected apertures in a selected vertical member adjacent to one of the sidewalls and having the connecting means on the opposite end of said frame engaged with aligned apertures in one of said vertical members of said third pair.

3. The apparatus for supporting and bracing freight as set forth in claim 2 wherein said first and second pairs of vertical support members are integral with their adjacent sidewalls.

4. In a freight carrying body having a floor disposed in a horizontal plane, left and right opposing vertical sidewalls, a front wall, and a ceiling parallel to the floor, three spaced pairs of tracks extending longitudinally of said body, each pair of said tracks having one track mounted on the ceiling and an oppositely aligned track mounted on the floor, a first and a second pair of said tracks respectively positioned adjacent to the left and right sidewalls, a third pair of said tracks positioned equidistant from each sidewall between said first and second pairs, said tracks having a series of aligned spaced apertures along their longitudinal axes, said apertures in said tracks on the ceiling being oppositely aligned with said apertures in said tracks on the floor;

a first pair of spaced vertical posts extending vertically between one of said pairs of tracks that are adjacent to the sidewalls, a second pair of spaced vertical posts opposing said first pair of posts and extending vertically between said third pair of tracks, said posts having spaced apertures aligned along their longitudinal axes and having a locking means mounted on each end securing said posts to their associated tracks, one locking means on each post engaged with an aperture in an associated track on the ceiling and the other locking means on each post engaged with an aperture in an associated track on the floor, at least one locking means on each of said posts being retractable to remove said posts from their vertical positions;

the improvement comprising a unitary support frame having a pair of substantially parallel spaced elongated members, spaced support arms extending between said elongated members and being fixedly connected thereto, a detachable connecting means mounted on each end of the elongated members to secure each end thereof to one of said posts, said unitary support frame in a horizontal orientation having said connecting means on one end of said frame engaged with selected apertures in said first pair of posts and having said connecting means on the opposite end of said frame engaged with aligned apertures in said second pair of posts to provide an upper decking means to support articles of freight thereupon, or alternatively, said support frame is used in a first vertical orientation as a bracing means to retain articles of freight against the sidewalls of said body when positioned between said second pair of spaced vertical posts and having said connecting means on opposite ends of said frame engaged with aligned apertures in said second pair of posts, said support frame being used in a second vertical orientation to retain articles of freight against the front wall of said body by having the connecting means on one end of said frame engaged with selected apertures in one of said first pair of vertical posts and having the connecting means on the opposite end of said frame engaged with aligned apertures in one of said second pair of vertical posts.

5. Apparatus for supporting and bracing freight in a load carrying body, said body having a floor disposed in a horizontal plane, left and right opposing vertical sidewalls, a front wall, and a ceiling parallel to the floor, said apparatus comprising three spaced pairs of tracks extending longitudinally of said body, each pair of said tracks having one track mounted on the ceiling and an oppositely aligned track mounted on the floor, a first and a second pair of said tracks respectively positioned adjacent to the left and right sidewalls, a third pair of said tracks positioned equidistant from each sidewall between said first and second pairs, said tracks having a series of aligned spaced apertures along their longitudinal axes, said apertures in said tracks on the ceiling being oppositely aligned with said apertures in said tracks on the floor;

a first pair of spaced vertical posts extending vertically between one of said pairs of tracks that are adjacent to the sidewalls, a second pair of spaced vertical posts opposing said first pair of posts and extending vertically between said third pair of tracks, said posts having spaced apertures aligned along their longitudinal axes and having a locking means mounted on each end securing said posts to their associated tracks, one locking means on each post engaged with an aperture in an associated track on the ceiling and the other locking means on each post engaged with an aperture in an associated track on the floor, at least one locking means on each of said posts being retractable to remove said posts from their vertical positions;

a unitary support frame comprising a pair of substantially parallel spaced elongated members, spaced support arms extending between said elongated members and being fixedly connected thereto, a detachable connecting means mounted on each end of the elongated members to secure each end thereof to one of said posts, said unitary support frame in a horizontal orientation having said connecting means on one end of said frame engaged with selected apertures in said first pair of posts and having said connecting means on the opposite end of said frame engaged with aligned apertures in said second pair of posts to provide an upper decking means to support articles of freight thereupon, or alternatively, said support frame is used in a first vertical orientation as a bracing means to retain articles of freight against the sidewalls of said body when positioned between said second pair of spaced vertical posts and having said connecting means on opposite ends of said frame engaged with aligned apertures in said second pair of posts, said support frame being used in a second vertical orientation to retain articles of freight against the front wall of said body by having the connecting means on one end of said frame engaged with selected apertures in one of said first pair of vertical posts and having the connecting means on the opposite end of said frame engaged with aligned apertures in one of said second pair of vertical posts.

* * * * *